United States Patent [19]

Keesen et al.

[11] Patent Number: 5,353,060
[45] Date of Patent: Oct. 4, 1994

[54] PROCESS AND DEVICE FOR THE TRANSFORMATION OF IMAGE DATA

[75] Inventors: Heinz W. Keesen, Hanover; Edgar Peters, Ronnenberg, both of Fed. Rep. of Germany

[73] Assignee: Deutsche Thomson-Brandt GmbH, Villengen-Schwenningen, Fed. Rep. of Germany

[21] Appl. No.: 29,250

[22] Filed: Apr. 13, 1993

[30] Foreign Application Priority Data

Aug. 22, 1990 [DE] Fed. Rep. of Germany ....... 4026523

[51] Int. Cl.$^5$ ........................................... H04N 7/133
[52] U.S. Cl. ................... 348/408; 364/725
[58] Field of Search ............ 358/133; 382/41, 56; 364/725; 348/408, 403; H04N 7/133

[56] References Cited

U.S. PATENT DOCUMENTS

| | | | |
|---|---|---|---|
| 3,940,554 | 2/1976 | Masuda | 358/195.1 |
| 4,807,053 | 2/1989 | Heijnemans | 358/335 |
| 4,814,871 | 3/1989 | Keesen | 358/133 |

FOREIGN PATENT DOCUMENTS

| | | |
|---|---|---|
| 282135 | 9/1988 | European Pat. Off. . |
| 9101558 | 3/1992 | European Pat. Off. . |
| 3642664 | 4/1988 | Fed. Rep. of Germany . |
| 3940554 | 6/1990 | Fed. Rep. of Germany . |

OTHER PUBLICATIONS

Motion-Adaptive Intraframe Traansform Coding of Video Signals by P. H. N. DeWith, Philips Research Laboratories, The Netherlands.

Universal Coding of Transform Coefficients for Video Codecs, Proceedings of EUSIPCO-88, Grenoble, France, Sep. 1988.

*Primary Examiner*—Howard W. Britton
*Attorney, Agent, or Firm*—Joseph S. Tripoli; Eric P. Herrmann; Ronald H. Kurdyla

[57] ABSTRACT

A video signal processing system includes encoder apparatus applying a Discrete Cosine Transform (DCT) to $N \times N$ (e.g., $8 \times 8$) image data blocks. Resulting DCT coefficients are further transformed by multiplying them with a special transform matrix of predominantly zero values. A comparator determines whether the original DCT coefficients or the further transformed DCT coefficients will be coded for data compression, with respect to static or dynamic image content. Complementary transformation is performed at a decoder.

12 Claims, 3 Drawing Sheets

```
32,   0,   0,   0,   0,   0,   0,   0
 0,   7,   0,   7,   0,  12,   0,  28
 0,  28,   0,  12,   0,  -7,   0,  -7
 0,  12,   0, -28,   0,  -7,   0,   7
 0,   0,  32,   0,   0,   0,   0,   0
 0,   0,   0,   0,  32,   0,   0,   0
 0,   7,   0,  -7,   0,  28,   0, -12
 0,   0,   0,   0,   0,   0,  32,   0
```

```
32,   0,   0,   0,   0,   0,   0,   0
 0,   0,   0,   0,   0,   8,   0,  31
 0,  31,  -8,   0,   0,   0,   0,   0
 0,   8,  31,   0,   0,   0,   0,   0
 0,   0,   0,  32,   0,   0,   0,   0
 0,   0,   0,   0,  32,   0,   0,   0
 0,   0,   0,   0,   0,  31,   0,  -8
 0,   0,   0,   0,   0,   0,  32,   0
```

PROCESS AND DEVICE FOR THE TRANSFORMATION OF IMAGE DATA

This is a continuation of PCT application PCT/EP 91/01558 filed Aug. 16, 1991 by Heinz-Werner Keesen et al., titled Process and Device for Transformation of Image Data.

FIELD OF THE INVENTION

The invention concerns the transformation of image representative information.

BACKGROUND OF THE INVENTION

Processing image representative data often requires or benefits from data reduction in the form of data compression coding. Data compression is beneficial, for example, in the context of digital video recording.

A conventional data compression method comprises transforming blocks of image pixels, e.g., 8×8 pixel blocks by means of a DCT (discrete cosine transformation). Such a process is described, for example, in an article "Scene Adaptive Coder", W. H. Chen and W. K. Pratt, IEEE Transactions on Communications, Vol. COM32, No. 3, March, 1984. Data reduction is made possible by the fact that the pixels within such blocks are correlated with one another, and the important transformation coefficients are therefore concentrated in a few locations within each transformed block. Thus only a few coefficients per block need to be coded rather than 64 (8×8 pixels). Conventional television standards such as PAL, SECAM, and NTSC form an image frame based upon the information contained in a pair of successive image fields. If two successive fields are combined, and the pixel blocks to be transformed are taken from these fields, the pixels in these blocks, which come from the respective fields, may exhibit little spatial correlation with those from the other field in the case of dynamic (e.g., moving) image content. As a result, transformation coding can be ineffective.

Transformation coding adapted to static and dynamic image content has been proposed. For example in German DE 3642664 it has been proposed to switch between an 8×8 DCT and two corresponding 4×8 DCTs per block. An 8×8 DCT is performed for the respective block with static image content, whereas two 4×8 DCT transformations are performed for the respective block with dynamic image content, separately for the pixels of the respective field. However, this means that apparatus using this method must be able to perform two types of transformation, the implementation of which is relatively complex.

SUMMARY OF THE INVENTION

It is an object of the present invention to provide effective image data transformation, e.g., of the type described in a field based image system, particularly in the presence of dynamic image information. To reduce transformation complexity, an additional special transformation of original 8×8 DCT coefficient blocks already transformed is employed instead of a 4×8 DCT. The additional special transformation involves multiplying the original 8×8 DCT coefficients of each block by a special comparison matrix with predominantly zero values. A coder decides whether it is more effective to code the original 8×8 DCT coefficients, or the 8×8 DCT coefficients multiplied by the special matrix. The coder afterwards performs further block coding such as by means of weighting, quantisation and Huffman coding. The special transform matrix is configured so that multiplication by the matrix can be readily implemented with simple add and shift operations.

DETAILED DESCRIPTION

Figures 1, 2, 3:
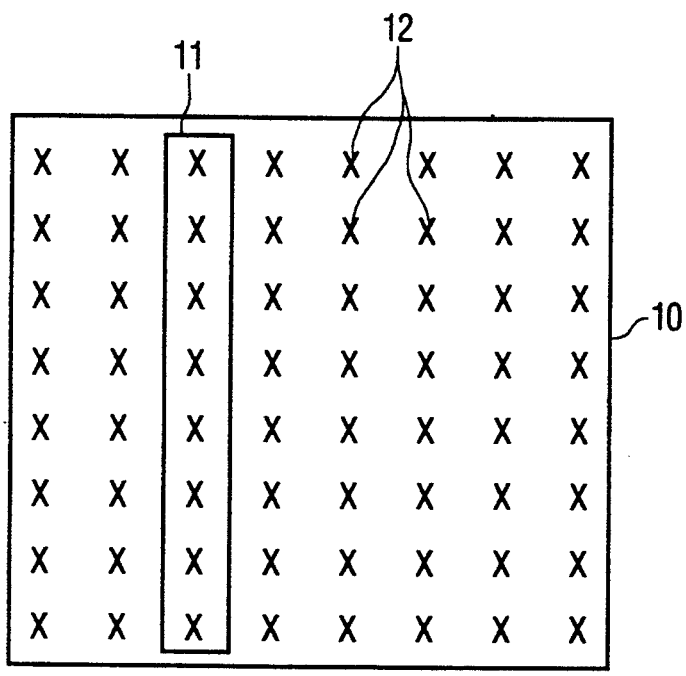
FIG. 1 represents a block of 8×8 transform coefficients.
FIGS. 2 and 3 respectively show first and second types of special transform matrices which may be used in accordance with the present invention.

FIG. 1 shows a block 10 comprising 64 (i.e., 8×8 transformation coefficients 12, produced from a two-dimensional DCT transformation of a corresponding block of pixels. Each of the eight columns 11 of coefficient block 10 are multiplied by a special matrix as shown, for example, in FIG. 2 or FIG. 3. The special matrix has a relatively large number of "zero" values. Most of the remaining values are multiples of two. Multiplying columns 11 by the special matrix therefore can be advantageously performed by means of uncomplicated add and shift operations.

The multiplication of columns 11 of coefficient block 10 by the special matrix can be considered as a new type of transformation adapted to moving image content, called special transformation in the following text. The special transformation considers the difference in correlation between pixels in the blocks of successive image fields, and provides for more effective coding and a resultant lower data rate or higher image quality, respectively.

Figure 4:
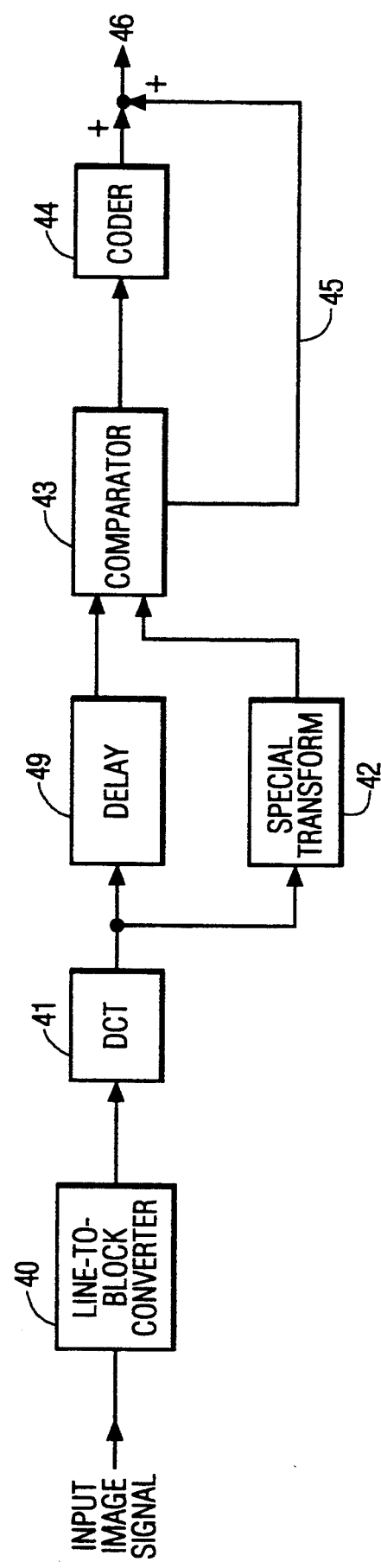
FIG. 4 depicts encoder apparatus in accordance with the principles of the present invention.

FIG. 4 shows encoder apparatus which uses this method for coding image signals. A line-to-block converter 40 receives line-by-line digital image signals which, in the case of a television receiver for example, have been received from a broadcast television transmitter, demodulated, split into luminance and chrominance signal components and converted from analog to digital form. From such signal, blocks of pixels, e.g., 8×8 pixel blocks, are formed in accordance with known methods, and supplied to a two-dimensional DCT transformation unit 41. Transformation unit 41 may include, for example, an STV 3208 type integrated circuit produced by SGS Thomson. The transformation coefficients developed by transformation circuit 41 are supplied to a first input of a comparator 43 via a time equalizing delay circuit 49. The coefficients developed by transformation circuit 41 are also provided to a special transformation unit 42, which contains column formers, adders, shifters and/or multipliers. The use of unit 42 avoids the need for a relatively complex second DCT transformation circuit for providing two 4×8 transformations, as mentioned previously.

Special transformation unit 42 performs the matrix multiplication:

$$[Y_n] = [T] \times [X_n].$$

$[X_n]$ represents one column 11 of DCT transformation coefficients 12. Specifically, $$[X_n] = \begin{pmatrix} x_{1n} \\ . \\ . \\ . \\ x_{8n} \end{pmatrix}, \text{ where } n \text{ has values from 1 to 8.}$$

[T] is a special transformation matrix as shown in FIG. 2 or FIG. 3 used in conjunction with a comparison process as will be discussed. [$Y_n$] represents a corresponding column of resulting special transformation coefficients. The values of the elements of the columns are then divided, for example by a shift operation, by the amount of the left-hand top element of matrix [T] (the value 32 in FIG. 2 or FIG. 3) to obtain a value range corresponding to the input column for the result column. Eight such columns are in each case combined again to form one 8×8 block of special transformation coefficients, and applied to a second input of comparator 43. The coefficient matrices [X] and [Y] at the inputs of comparator 43 have the following structure:

$$[X] = \begin{pmatrix} X_{11} & . & . & . & X_{18} \\ . & & & & . \\ . & & & & . \\ . & & & & . \\ X_{81} & . & . & . & X_{88} \end{pmatrix}$$

$$[Y] = \begin{pmatrix} Y_{11} & . & . & . & Y_{18} \\ . & & & & . \\ . & & & & . \\ . & & & & . \\ Y_{81} & . & . & . & Y_{88} \end{pmatrix}$$

where $X_{11}$ and $Y_{11}$ represent respective left-hand top elements.

In static images, the significant coefficients needed for reconstructing images in a corresponding decoder are contained approximately within a triangular-shaped region defined by values $X_1 \ldots X_{18} \ldots X_{81}$ in the statistic mean. In dynamic images, significant coefficients are also contained within the triangular shaped region $X_1 \ldots X_{18} \ldots X_{81}$ in the statistic mean. This effect is reduced in special-coefficient matrix [Y] by multiplying the columns of matrix [X] by special comparison matrix [T]. Matrix [T] contains predominantly zero values and, in the case of moving image content, generates a coefficient distribution approximating static image content, with correspondingly modified coefficients. Comparator 43 forms, for example, the two sums of the amounts of the corresponding coefficients from rows $X_{81} \ldots X_{88}$ and $Y_{81} \ldots Y_{88}$ of the coefficient matrices present at the two inputs and originating from the same pixel block. Of the two matrices, the coefficients of the matrix in which this sum is smaller will be coded by coding circuit 44. Coding circuit 44 contains, for example, a weighting circuit, a scanner, a quantiser and a Huffman coder for producing a data compressed output signal. It is possible to form only the sum of the values of matrix elements $X_{81}$, $X_{82}$ and $X_{83}$ and, respectively, $Y_{81}$, $Y_{82}$ and $Y_{83}$ in comparator 43 to produce this decision.

Comparator 43 also produces a control signal indicating the type of transformation which was selected, i.e., representing which sum was smaller. This control signal is conveyed via a line 45 to a summing point at the output of coder 44, where the control signal is combined with the output signal from unit 44 in a predetermined manner so as to facilitate recovery of the control signal at a decoder. This combined signal, together with audio and channel coding information for example, forms a composite output signal 46 which may be transmitted or stored on various media such as on magnetic tape.

Figure 5:
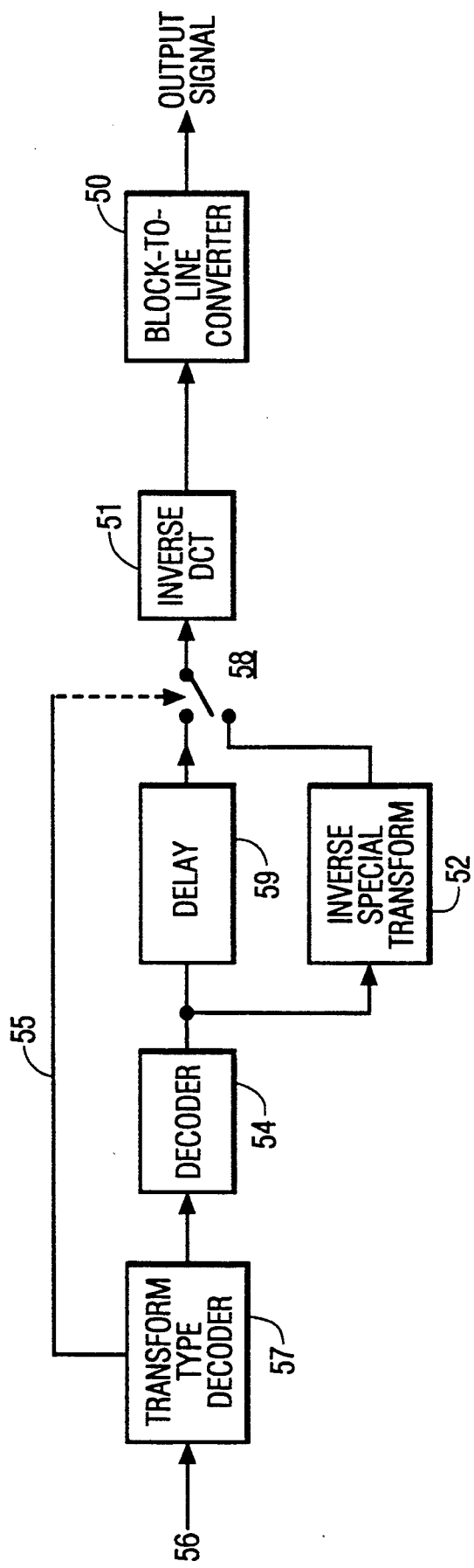
FIG. 5 depicts decoder apparatus in accordance with the present invention.

A decoder in FIG. 5 receives composite signal 56 as provided by the encoder of FIG. 4. In a transformation-type decoding circuit 57, information derived from the control signal as to the type of transformation to be used during decoding process is recovered and supplied to a control input of an electronic switch 58 via a line 55. A decoder (data decompression) circuit 54 performs the inverse of the signal processing performed by coding circuit 44 in the encoder apparatus of FIG. 4. Circuit 54 correspondingly contains a Huffman decoder, descanner and inverse weighting network. The output signal from circuit 54 passes via a time equalizing delay circuit 59 to a first input of an electronic switch 58, and to a circuit 52 for performing an inverse of the special transformation performed at the encoder. The output of circuit 52 is connected to a second input of switch 58.

Depending on the recovered transformation-type control signal information on line 55, the output signal from decoding circuit 54 is conducted unchanged via delay 59 to an inverse DCT circuit 51 for static images. In the case of a dynamic image, the output of circuit 54 is conveyed via an inverse special transform circuit 52 and switch 58 to inverse DCT unit 54. In inverse special transformation circuit 52, columns of coefficients are first taken from the respective coefficient block as in the encoder (FIG. 4). These columns are multiplied by a special matrix in accordance with FIG. 2 of FIG. 3 but which has been transposed, in accordance with the formula:

$$[Y_n] = [T^T] \times [X_n]$$

[$X_n$] in each case represents a column 11 of special-transformed coefficients 12:

$$[X_n] = \begin{pmatrix} x_{1n} \\ . \\ . \\ . \\ x_{8n} \end{pmatrix}, \text{ where } n \text{ exhibits values from 1 to 8.}$$

[$T^T$] is the transposed special transformation matrix [T]. The transposed matrix, like original matrix [T], contains predominantly zero values. The transposed matrix generates a coefficient distribution approximately corresponding to static image content, with correspondingly modified coefficients, for a corresponding coding in the case of dynamic image content.

[$Y_n$] in each case represents a corresponding column of a two-dimensionally transformed DCT coefficient block. These blocks are divided element by element by the amount of the left-hand top element of the [$T^T$] matrix, as in the encoder of FIG. 4, and inversely DCT transformed in circuit 51. The circuit for the inverse DCT transformation 51 may also employ an STV 3208 type integrated circuit produced by SGS Thomson. At the output of inverse DCT circuit 51, the original pixel blocks are essentially recovered. These blocks of pixels are converted by a block-to-line converter 50 into line-serial digital image signals, which may be converted from digital to analog form and transformed into a composite color video signal.

Plural encoder apparatus (FIG. 4) and decoder apparatus (FIG. 5) can be arranged for respectively processing luminance and chrominance signals in parallel. The control signal from comparator 43 can be developed and transmitted separately for luminance and chrominance information. However, it is also possible to employ only one comparator for luminance processing, the decision of which comparator is also used for processing the chrominance signal. Comparator(s) 43 can decide separately for each block, or in each case make a decision for a group of blocks, for example one frame. Block sizes other than 8×8, for example 16×16 or 4×4, may also be used.

We claim:

1. In a system for encoding image representative data, apparatus including:
   means for transforming image data into blocks containing rows and columns of coefficients respectively representing transformed values of image data within each said block;
   special transform means for multiplying each column of coefficients by a comparison matrix having rows and columns of predominantly zero values;
   means for providing a comparison of (a) a first sum of predetermined coefficient values and (b) a second sum of predetermined modified coefficient values resulting from said multiplying by said comparison matrix, for producing at an output coefficients associated with the smaller of said first and second sums; and
   means for coding output coefficients from said comparison means to produce a coded output signal.

2. Apparatus according to claim 1, wherein said comparison matrix in the case of dynamic image content produces a coefficient distribution approximating static image content with correspondingly modified coefficients.

3. Apparatus according to claim 1, wherein said comparison matrix is of the form

| 32 | 0  | 0  | 0   | 0  | 0  | 0  | 0   |
|----|----|----|-----|----|----|----|-----|
| 0  | 7  | 0  | 7   | 0  | 12 | 0  | 28  |
| 0  | 28 | 0  | 12  | 0  | −7 | 0  | −7  |
| 0  | 12 | 0  | −28 | 0  | −7 | 0  | 7   |
| 0  | 0  | 32 | 0   | 0  | 0  | 0  | 0   |
| 0  | 0  | 0  | 0   | 32 | 0  | 0  | 0   |
| 0  | 7  | 0  | −7  | 0  | 28 | 0  | −12 |
| 0  | 0  | 0  | 0   | 0  | 0  | 32 | 0   |

4. Apparatus according to claim 1, wherein said comparison matrix is of the form

| 32 | 0  | 0  | 0  | 0  | 0  | 0  | 0  |
|----|----|----|----|----|----|----|----|
| 0  | 0  | 0  | 0  | 0  | 8  | 0  | 31 |
| 0  | 31 | −8 | 0  | 0  | 0  | 0  | 0  |
| 0  | 8  | 31 | 0  | 0  | 0  | 0  | 0  |
| 0  | 0  | 0  | 32 | 0  | 0  | 0  | 0  |
| 0  | 0  | 0  | 0  | 32 | 0  | 0  | 0  |
| 0  | 0  | 0  | 0  | 0  | 31 | 0  | −8 |
| 0  | 0  | 0  | 0  | 0  | 0  | 32 | 0  |

5. Apparatus according to claim 1, wherein said transform means provides a Discrete Cosine Transform.

6. Apparatus according to claim 1, wherein said second sum is derived from at least a bottom row of a matrix of modified coefficients produced by said multiplication with said comparison matrix.

7. Apparatus according to claim 6, wherein said second sum is derived exclusively from a bottom row of a matrix of said modified coefficients.

8. Apparatus according to claim 1, wherein said comparison means produces a signal indicating the results of said comparison, indicating which of said first and second sums associated with said first and second coefficient matrix values is smaller.

9. Apparatus according to claim 8 and further including
   means for combining said indicating signal with said coded output signal.

10. In a system for transforming and encoding image representative data, apparatus including:
    line-to-block converter means for converting image representative lines into a plurality of image data blocks defined by a predetermined number of rows and columns;
    two-dimensional transform means for providing first coefficients respectively representing transformed values of image data within each said block;
    special transform means for multiplying said first coefficients by a comparison matrix having predominantly zero values which, in the case of dynamic image content, produces a coefficient distribution approximating static image content with correspondingly modified coefficients;
    signal delaying means;
    comparison means for receiving said first coefficients via said delaying means at a first input and for receiving modified coefficients from said special transform means at a second input, said comparison means providing a comparison of (a) a first sum of predetermined first coefficient values and (b) a second sum of predetermined modified coefficient values resulting from said multiplying by said comparison matrix, said second sum being derived from at least a bottom row of a matrix of modified coefficients produced by said multiplication with said comparison matrix, said comparison means producing a signal indicating the results of said comparison as to which of said first and second sums is smaller, said comparison means providing at an output coefficients associated with the smaller of said first and second sums;
    means for coding output coefficients from said comparison means to produce a coded output signal; and
    means for combining said indicating signal with said coded output signal.

11. Decoding apparatus responsive to a coded output signal in accordance with claim 10 and further including a signal component indicating the results of said comparison, said apparatus comprising
    means for recovering said indicating signal;
    means for decoding said coded signal;
    inverse transform means having an input and an output;
    switch means for conveying signals to said input of said inverse transform means, said switch means having first and second inputs and being responsive to said indicating signal for conveying signals from either said first input or said second input to said inverse transform means in response to said indicating signal;

means for coupling output signals from said decoding means to said first input of said switch means;

inverse special transform means having an input for receiving output signals from said decoding means and an output coupled to said second input of said switch means, for multiplying input signals with a transposed comparison matrix having predominantly zero values; and block converter means responsive to output signals from said inverse special transform means for providing an output signal.

12. Apparatus according to claim 10, wherein said transposed comparison matrix generates a coefficient distribution approximating static image content, with correspondingly modified coefficients, in a case of moving image content.

* * * * *